(No Model.)  3 Sheets—Sheet 1.

J. L. PARROTT.
SEEDER AND CULTIVATOR.

No. 460,399. Patented Sept. 29, 1891.

WITNESSES:
A. J. Schwartz
J. E. Edwards

INVENTOR
J. L. Parrott

BY
W. F. FitzGerald & Co.
ATTORNEYS.

(No Model.) 3 Sheets—Sheet 2.

J. L. PARROTT.
SEEDER AND CULTIVATOR.

No. 460,399. Patented Sept. 29, 1891.

WITNESSES:
A. J. Schwartz
J. E. Edwards

INVENTOR
J. L. Parrott
BY W. T. Fitzgerald & Co.,
ATTORNEYS.

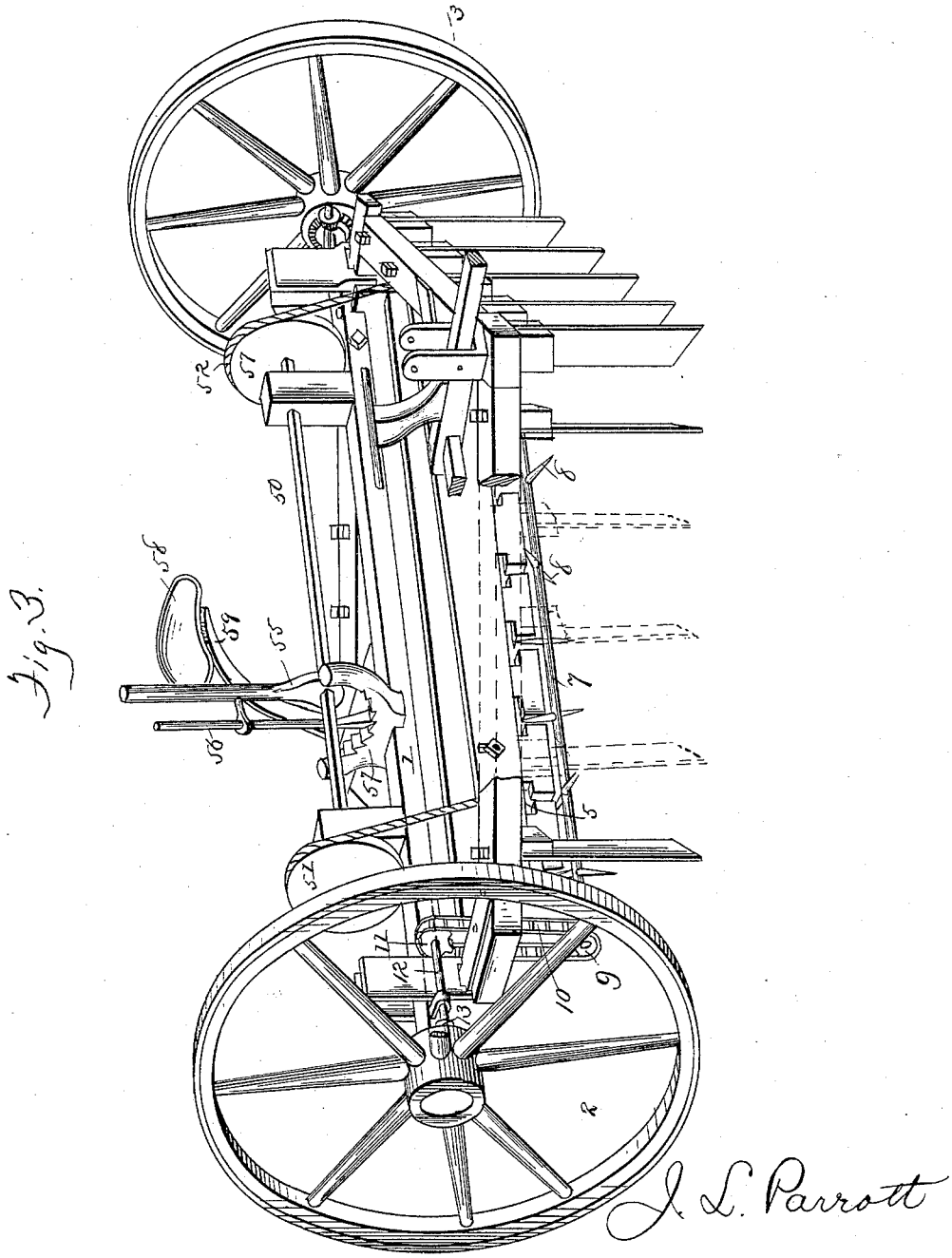

UNITED STATES PATENT OFFICE.

JOEL LEWIS PARROTT, OF HESS, OKLAHOMA TERRITORY.

SEEDER AND CULTIVATOR.

SPECIFICATION forming part of Letters Patent No. 460,399, dated September 29, 1891.

Application filed March 9, 1891. Serial No. 384,327. (No model.)

*To all whom it may concern:*

Be it known that I, JOEL LEWIS PARROTT, a citizen of the United States, residing at Hess, in the county of Greer and Territory of Oklahoma, have invented certain new and useful Improvements in Seeders and Cultivators; and I do hereby declare the following to be a full, clear, and exact description of the invention, such as will enable others skilled in the art to which it appertains to make and use the same.

My invention consists in a new and improved combined seeder and cultivator, which can be instantly adjusted so as to sow either corn in two rows at the same time or to sow grain either broadcast or in furrows, and which is also adapted to be used as a harrow or cultivator.

My invention will be hereinafter fully described and claimed.

Figure 1:
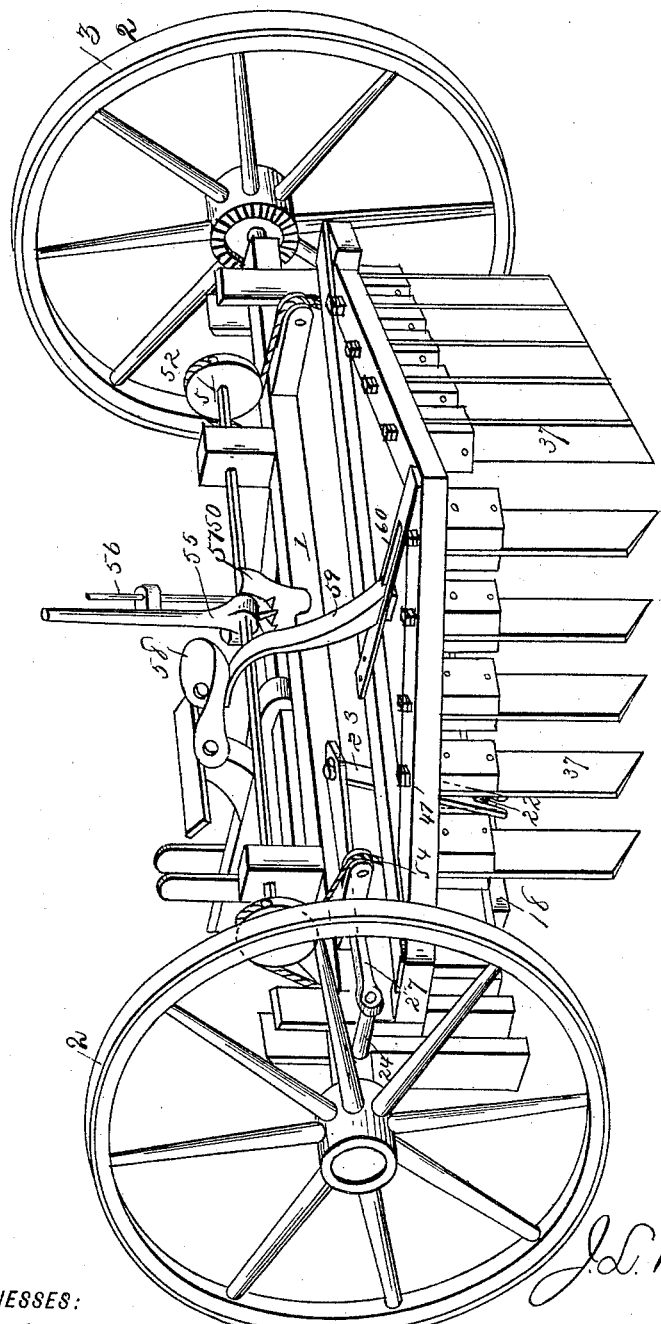
Figure 2:
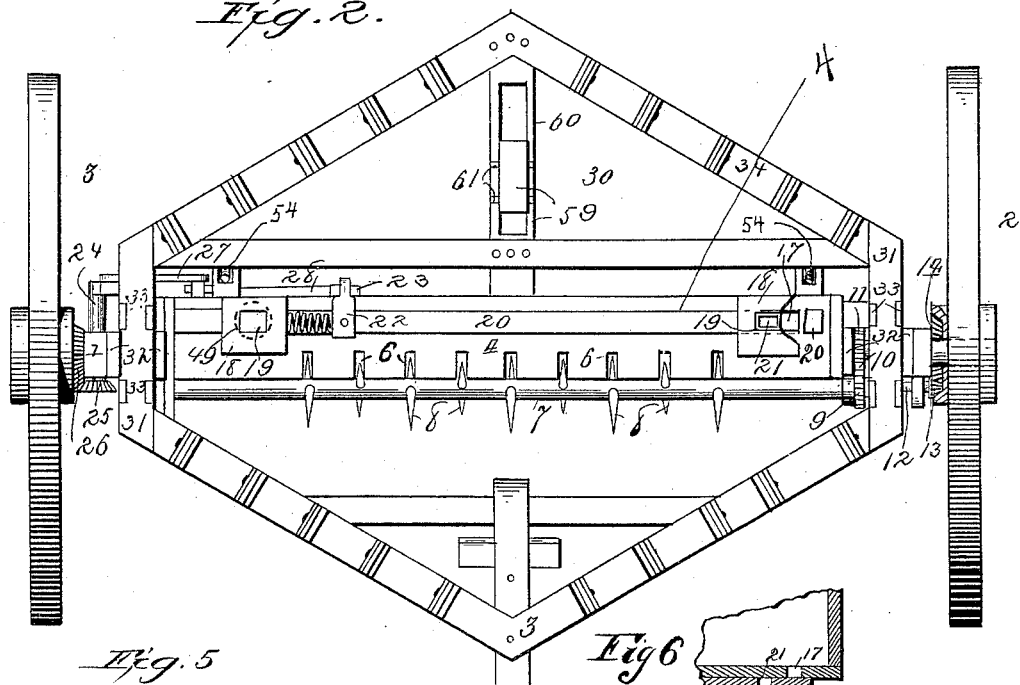
Figures 4, 5, 6:
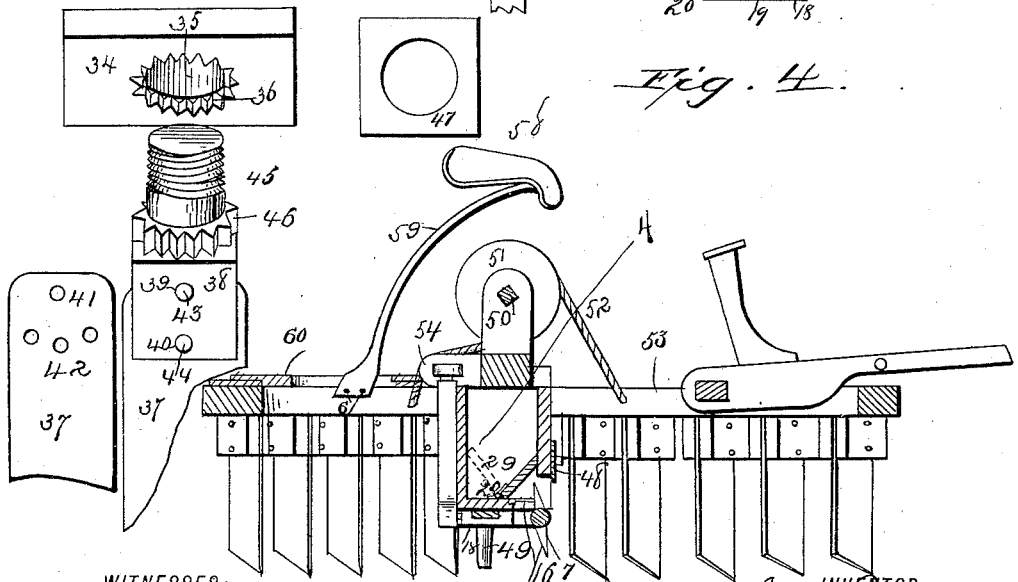

Referring to the accompanying drawings, Figure 1 is a perspective view of my combined seeder and cultivator. Fig. 2 is a bottom plan view of the same. Fig. 3 is a perspective rear view. Fig. 4 is a central vertical sectional view. Fig. 5 illustrates in detail one of the adjustable harrow-blades. Fig. 6 is a detail view, hereinafter referred to.

The same numerals of reference indicate corresponding parts in all the figures.

Referring to the several parts by their designating-numerals, 1 indicates the axle of the machine, on the ends of which are mounted and revolve the main wheels 2 3. Beneath the axle is secured removably the longitudinal seed-box 4, in which the grain or corn to be sown is placed. The front lower end or corner of this box is formed with the series of openings 5, and in the bottom of the box are formed the series of slots 6, which lead to the openings 5.

Beneath the forward lower corner of the seed-box is supported in end bearings a shaft 7, which is provided with the transverse projecting fingers or spikes 8. On the right-hand end of this shaft a sprocket-pinion 9 is keyed, and a sprocket-chain 10 passes around this pinion, and a sprocket-wheel 11 secured on the inner end of a shaft 12, which is mounted in bearings at that end of the axle 1. The outer end of this shaft is provided with a bevel-pinion 13, which meshes into a ring 14 of teeth formed on the inner end of the right-hand main-wheel hub. It will thus be seen that the shaft 7 will be rapidly revolved as the machine is drawn forward, and as it revolves the ends of its fingers 8 enter the slots 6 and pass out of the box through the openings 5. The grain contained in the seed-box will be thus thrown out through the openings 5 and scattered over the ground, being thus sown broadcast. When, however, it is desired to plant the seed in furrows, the ordinary rubber feed-tubes are employed, leading from each opening 5 to points just back of the front cutters or harrow-blades, hereinafter described.

To prevent all leakage of grain through the bottom slots 6, the usual brushes or guards 16 may be employed, secured on the inner side of the box, as shown in Fig. 4. The amount of grain sown is regulated by an adjustable slide 48, which slides, as shown, down in front of the series of openings 5.

In the rear part of the seed-box bottom two discharge-openings 17 (see Figs. 2 and 6) are formed, one near each end of the box. Beneath these openings are secured the casings 18, having the openings 19, arranged to one side of the openings 17. The ends of the feed-bar 20 slide in these casings and is formed with the usual openings 21 21, which as the bar is reciprocated back and forth register first with the box-openings 17 and then with the lower openings 19. (See Fig. 6.) From this bar projects a pin 22, the outer end of which extends within the bifurcated lower end of a centrally-pivoted lever 23. In the left-hand end of the axle 1 is mounted a small transverse shaft 24, having a pinion 25 on one end, which meshes with a ring of teeth 26 on the inner end of the hub of that main wheel 3, while the rear end of this shaft 24 is formed with a crank, and is connected by a link 27 with the outer end of a sliding rod 28, the inner end of which is pivotally connected with the upper end of the centrally-pivoted lever 23. It will be seen by this construction that as the machine travels forward the bar 20 will be reciprocated back and forth and the corn will be thus fed down from the seed-box into the two furrows. The corn is guided through metal or rubber chutes 49 from the seed-box down to the furrows.

In the center of the bottom of the seed-box is pivoted at the lower edge of its two ends a partition-board 29, which is turned back when the grain is to be sown through the front openings 5, and turned forward when corn is to be sown through the rear openings 17, thus cutting off the grain or corn from the openings which are not to be used.

30 indicates the harrow-frame, which is practically diamond-shaped. The end cross-pieces 31 of the harrow-frame slide between parallel guide-pieces 32 32, extending down from the axle 1, while upon the end pieces 31 are secured parallel guide-pieces 33 33, which extend up on each side of the axle, near the ends of the same. In the head-pieces 34 of the harrow are formed the series of vertical openings 35, which are round in cross-section; but the lower ends of these openings are formed with the annular series of serrations or teeth 36. Each harrow-blade 37 is mounted at its upper end in a head-piece or head-block 38. The lower end of each head-block is slotted vertically and formed with an upper and a lower perforation 39 40, and the upper end of each blade 37 is formed with an upper hole 41 and a series of lower apertures 42, arranged on a curved line. Each blade 37 is secured in position in its head-block by an upper pin 43, passing through the upper openings of the block and blade end, and by a lower pin 44, passing through the lower block-opening 40 and through either one of the series 42 of lower blade-apertures. It will be seen that by this construction the blades can be inclined either forward or backward or secured in a straight vertical line. The upper end of each head-block 38 is formed with a round pin 45, the upper end of which is threaded, and with an annular series of serrations 46, arranged around the lower end of this pin, at the upper shouldered end of the head-block. The pin 45 fits up through the opening 35 of the harrow-frame, and the serrations 46 fit into the serrations 36 of the head-frame, and it will be seen that by this novel construction the head-blocks and blades can be turned around at any angle desired in the harrow-frame and then raised to lock their serrations 46 in the serrated openings, when the nuts 47 are tightened to hold the blocks and blades in their adjusted positions. One of the pins 43 or 44 is made of wood, so that if a blade strikes a stone or root the pin will break and the blade fly up, thus preventing the blades being broken by such obstructions. It will now be seen that the blades 37 can be set at any angle desired and inclined forward or rearward, as may be at any time required. The blades can be set so as to throw the dirt either to the right or to the left by turning their upper ends in the sockets 35, and they can be set or inclined forward and adjusted to throw the dirt either to the right or left, or slanted backward and then set to either cut straight or throw the dirt to the right or left. The front and rear blades are set in the frame 30 with such relation to each other's positions that when all the blades are set to throw the dirt inward one front blade will open a furrow and the rear blade behind it will fill up that furrow, and so with all the blades from end to end of the frame, and when the rear blades are set to throw the dirt outward the front blades will leave each a furrow for the one behind to fill, &c.

When the machine is desired for use as a harrow only, the seed-box with its connecting parts can be readily removed.

Upon the axle 1 is mounted in bearings a shaft 50, upon the ends of which are secured the grooved wheels 51 51. Ropes or chains 52 are secured at their lower ends to the frame-pieces 53 of the harrow, the rear chains passing over grooved rollers 54 and are secured at their upper ends to the grooved wheels 51 at opposite points in the periphery of the same, as shown. Upon the shaft 50 lever 55 is secured, by means of which the shaft 50 can be turned, thus widening the chains 52 up upon the grooved wheels 51 and raising the harrow-frame, by which construction the harrow-blades can be raised out of contact with the ground at any desired time or point. The harrow can be secured in this raised position by engaging the end of the catch 56 on the side of the lever 55, with a curved rack 57, secured on the axle 1. The driver's seat 58 is mounted on a seat-support 59, the lower end of which is reduced and shouldered to adapt it to fit and slide on a longitudinally-slotted supporting-bar 60, transverse threaded bolts 61 passing through the lower extremity of the reduced support end. By this construction the seat can be adjusted forward or backward, as may be desired.

Having thus described my invention, what I claim, and desire to secure by Letters Patent, is—

1. In a combined seeder and cultivator, the combination, with the seed-box 4, formed with the series of front openings 5 and slots 6 and having the rear feed-openings 17, of the centrally-arranged division of partition-board 29, pivoted at its lower edge, substantially as and for the purpose set forth.

2. The combination, with the axle, of the longitudinally-arranged seed-box, the diamond-shaped harrow-frame, the slotted head-blocks formed with the apertures 39 40 and pivotally secured to the harrow-frame, so that they can be turned at any angle, the blades 37, formed with the upper apertures 41 and the series of lower apertures 42, and the pivot-pins 43 44, substantially as set forth.

3. The combination of a harrow-frame formed with the round openings 35 and the annular series of serrations 36 at the lower end of the same, the head-blocks 38, formed each with the slotted and apertured lower end, the round pin 45 at the upper end and the annular series of serrations 46 at the lower end of said pin, the nuts screwing on the upper ends of the pins 45, and the blades 37, formed with the upper apertures 41 and the series of lower apertures 42, substantially as set forth.

In testimony whereof I affix my signature in presence of two witnesses.

JOEL LEWIS PARROTT.

Witnesses:
R. T. SITTERLEY,
R. W. HAER.